(12) United States Patent
Konno et al.

(10) Patent No.: US 11,770,289 B2
(45) Date of Patent: Sep. 26, 2023

(54) COMMUNICATION DEVICE FOR TRANSMITTING DATA BY USING MULTILEVEL CODING, AND COMMUNICATION SYSTEM

(71) Applicant: FUJITSU LIMITED, Kawasaki (JP)

(72) Inventors: Toshihiro Konno, Sendai (JP); Junichi Sugiyama, Kawasaki (JP); Yohei Koganei, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 17/242,342

(22) Filed: Apr. 28, 2021

(65) Prior Publication Data
US 2022/0038327 A1    Feb. 3, 2022

(30) Foreign Application Priority Data

Jul. 31, 2020    (JP) ................................. 2020-129934

(51) Int. Cl.
| | |
|---|---|
| *H04L 27/34* | (2006.01) |
| *H04L 27/00* | (2006.01) |
| *H04B 10/516* | (2013.01) |
| *H04L 27/38* | (2006.01) |
| *H04B 10/61* | (2013.01) |
| *H04L 27/36* | (2006.01) |

(52) U.S. Cl.
CPC ....... *H04L 27/3405* (2013.01); *H04B 10/516* (2013.01); *H04B 10/612* (2013.01); *H04L 27/0012* (2013.01); *H04L 27/36* (2013.01); *H04L 27/38* (2013.01)

(58) Field of Classification Search
CPC . H04L 27/3405; H04L 27/0012; H04L 27/36; H04L 27/38; H04B 10/516; H04B 10/612
See application file for complete search history.

(56) References Cited

U.S. PATENT DOCUMENTS

| | | | | |
|---|---|---|---|---|
| 6,473,878 B1 * | 10/2002 | Wei | ................... | H03M 13/2703 |
| | | | | 714/755 |
| 8,719,670 B1 * | 5/2014 | Marrow | .............. | H03M 13/251 |
| | | | | 714/755 |
| 2001/0028684 A1 * | 10/2001 | Chung | .................. | H04L 1/0058 |
| | | | | 375/261 |

(Continued)

FOREIGN PATENT DOCUMENTS

WO    2008/038749 A1    4/2008

*Primary Examiner* — Sophia Vlahos
(74) *Attorney, Agent, or Firm* — Fujitsu Patent Center

(57) ABSTRACT

A communication device that generates a modulated signal with 32 QAM includes a modulator, a first encoder and a second encoder. The modulator generates a modulated signal by mapping each symbol in a data frame that includes transmission data, a first code, and a second code to a signal point among 32 QAM signal points. The first encoder encodes the data by using a first coding scheme to generate the first code. The second encoder encodes, by using a second coding scheme, a bit string formed from one specified bit in five bits allocated to each symbol in the data frame to generate the second code. The modulator performs mapping such that each pair of signal points adjacent to each other are arranged are different from each other in terms of a value of the one specified bit among the five bits.

6 Claims, 18 Drawing Sheets

(56) References Cited

U.S. PATENT DOCUMENTS

| | | | |
|---|---|---|---|
| 2003/0039318 A1* | 2/2003 | Tong | H04L 27/3411 375/298 |
| 2010/0150268 A1 | 6/2010 | Sasaki | |
| 2015/0071312 A1* | 3/2015 | Batshon | H04L 1/0056 398/115 |
| 2015/0078486 A1* | 3/2015 | Wang | H04L 27/38 375/320 |
| 2015/0092879 A1* | 4/2015 | Mansour | H03M 5/18 375/286 |
| 2016/0294417 A1* | 10/2016 | Suzuki | H03M 13/036 |
| 2017/0019210 A1* | 1/2017 | Yu | H04L 1/007 |
| 2020/0092155 A1* | 3/2020 | Kamiya | H04L 27/3411 |

\* cited by examiner

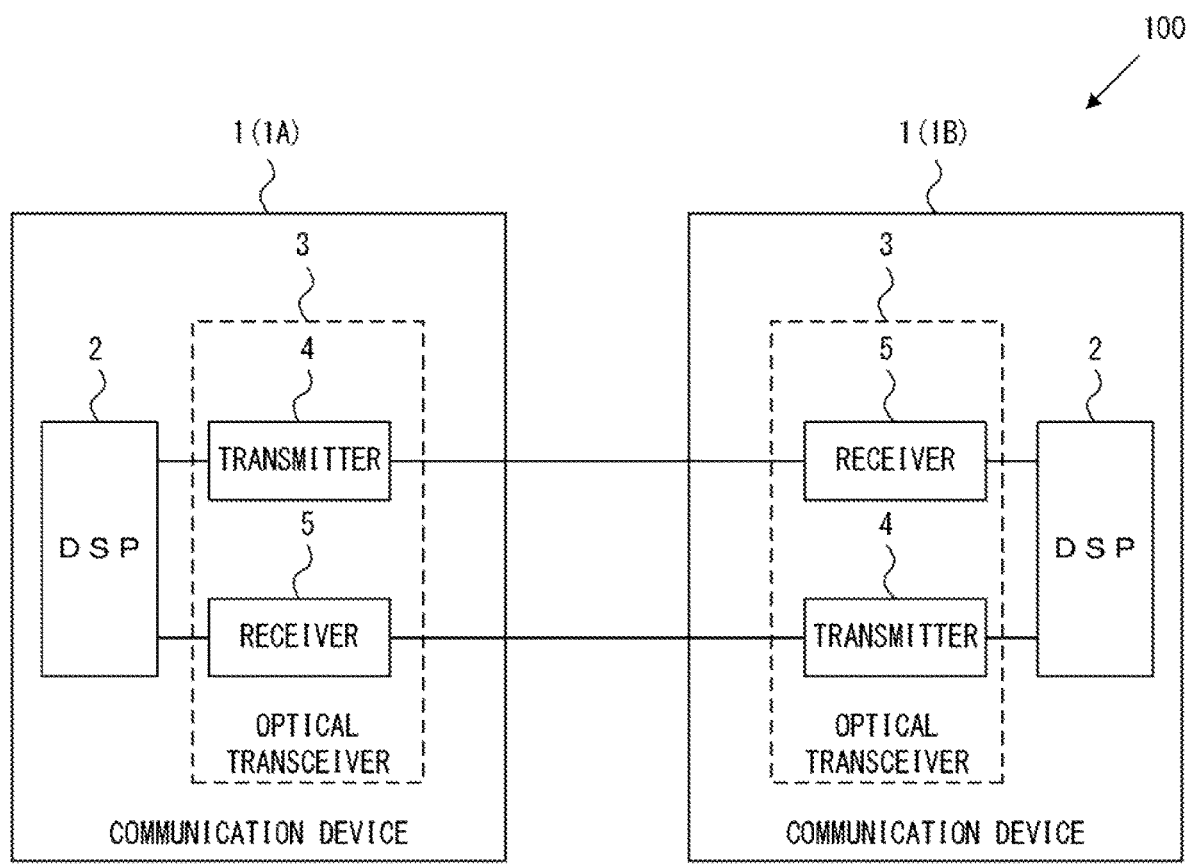
F I G. 2

FIG. 6A
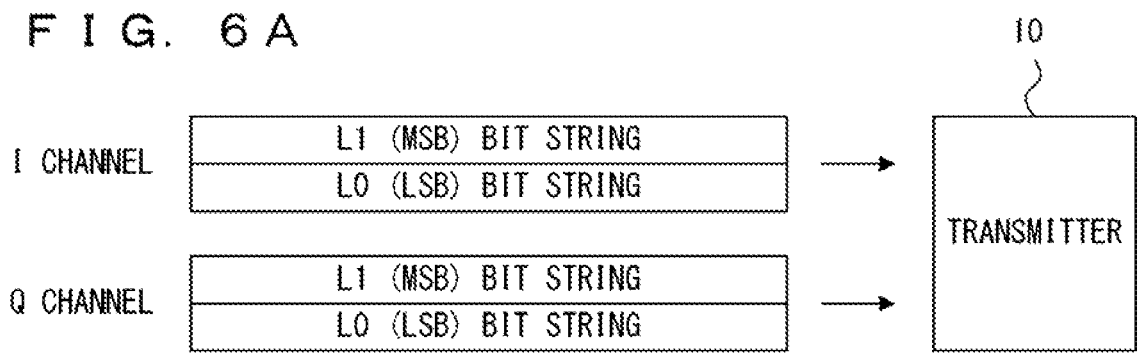
FIG. 6B
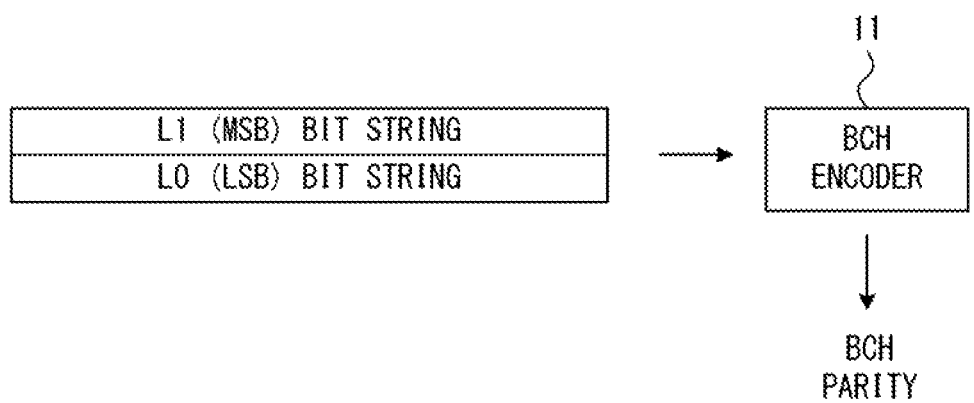
FIG. 6C
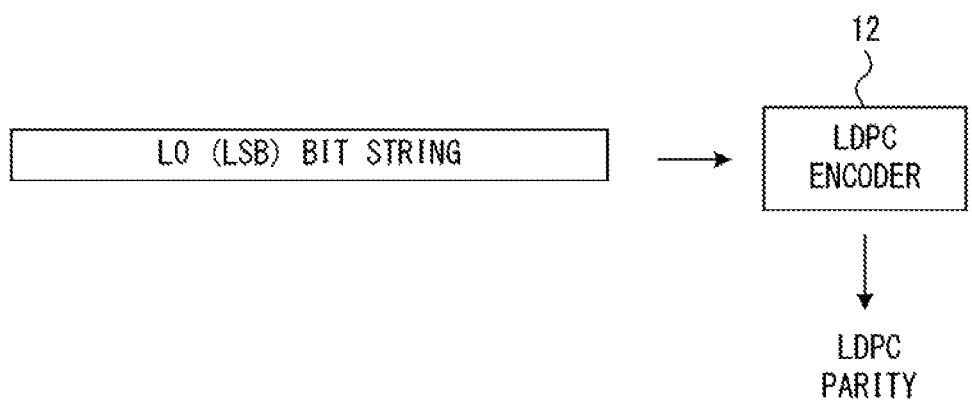
FIG. 6D
| L1 (MSB) BIT STRING | BCH PARITY |
| L0 (LSB) BIT STRING | LDPC PARITY | level 0 (LSB)

|   | 1 | 0 | 1 | 0 |   |
|---|---|---|---|---|---|
| 1 | 0 | 1 | 0 | 1 | 0 |
| 0 | 1 | 0 | 1 | 0 | 1 |
| 1 | 0 | 1 | 0 | 1 | 0 |
| 0 | 1 | 0 | 1 | 0 | 1 |
|   | 0 | 1 | 0 | 1 |   | level 1

|   | 0 | 0 | 1 | 1 |   |
|---|---|---|---|---|---|
| 0 | 0 | 0 | 1 | 1 | 1 |
| 0 | 0 | 0 | 1 | 1 | 1 |
| 0 | 0 | 0 | 1 | 1 | 1 |
| 0 | 0 | 0 | 1 | 1 | 1 |
|   | 0 | 0 | 1 | 1 |   | level 3

|   | 1 | 1 | 1 | 1 |   |
|---|---|---|---|---|---|
| 0 | 1 | 1 | 1 | 1 | 0 |
| 0 | 0 | 0 | 0 | 0 | 0 |
| 0 | 0 | 0 | 0 | 0 | 0 |
| 0 | 1 | 1 | 1 | 1 | 0 |
|   | 1 | 1 | 1 | 1 |   | level 2

|   | 1 | 1 | 1 | 1 |   |
|---|---|---|---|---|---|
| 1 | 1 | 1 | 1 | 1 | 1 |
| 1 | 1 | 1 | 1 | 1 | 1 |
| 0 | 0 | 0 | 0 | 0 | 0 |
| 0 | 0 | 0 | 0 | 0 | 0 |
|   | 0 | 0 | 0 | 0 |   | level 4 (MSB)

|   | 0 | 1 | 1 | 0 |   |
|---|---|---|---|---|---|
| 0 | 0 | 1 | 1 | 0 | 0 |
| 0 | 1 | 1 | 1 | 1 | 0 |
| 0 | 1 | 1 | 1 | 1 | 0 |
| 0 | 0 | 1 | 1 | 0 | 0 |
|   | 0 | 1 | 1 | 0 |   |

F I G. 1 1

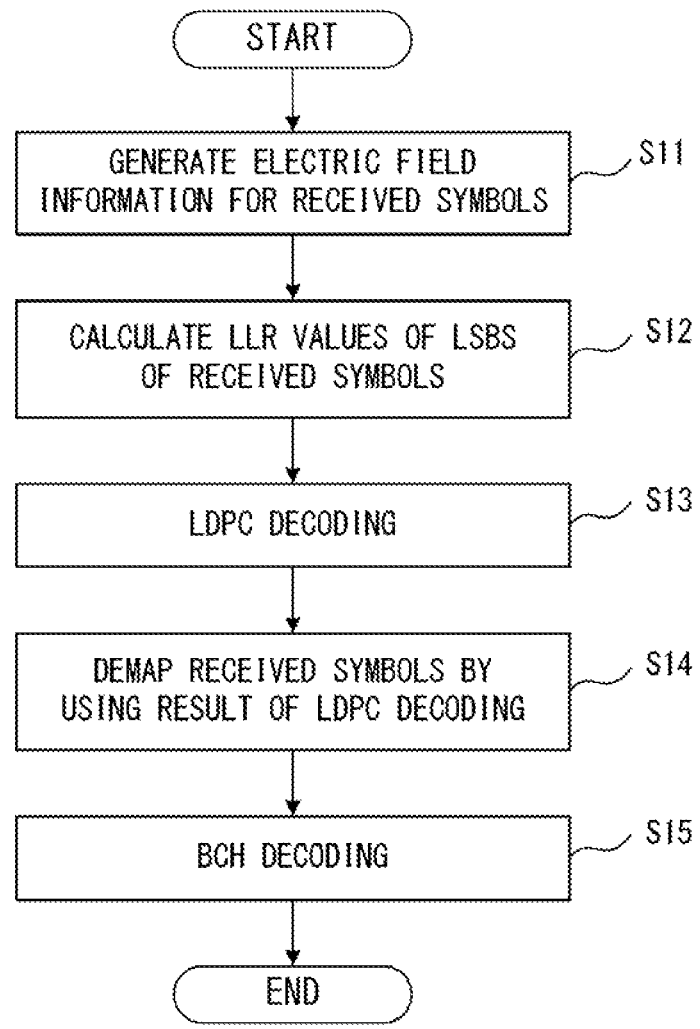
F I G. 1 4 level 0(LSB) + level 1

|    | 00 | 10 | 00 | 10 |    |
|----|----|----|----|----|----|
| 11 | 01 | 11 | 01 | 11 | 01 |
| 10 | 00 | 10 | 00 | 10 | 00 |
| 11 | 01 | 11 | 01 | 11 | 01 |
| 10 | 00 | 10 | 00 | 10 | 00 |
|    | 01 | 11 | 01 | 11 |    | level 3

|   | 0 | 0 | 0 | 0 |   |
|---|---|---|---|---|---|
| 1 | 0 | 0 | 0 | 0 | 1 |
| 1 | 0 | 0 | 0 | 0 | 1 |
| 1 | 0 | 0 | 0 | 0 | 1 |
| 1 | 1 | 1 | 1 | 1 | 1 |
|   | 1 | 1 | 1 | 1 |   | level 2

|   | 0 | 0 | 1 | 1 |   |
|---|---|---|---|---|---|
| 0 | 0 | 0 | 1 | 1 | 0 |
| 0 | 0 | 0 | 1 | 1 | 0 |
| 1 | 0 | 0 | 1 | 1 | 1 |
| 1 | 0 | 0 | 1 | 1 | 1 |
|   | 0 | 0 | 1 | 1 |   | level 4(MSB)

|   | 0 | 0 | 0 | 0 |   |
|---|---|---|---|---|---|
| 1 | 0 | 0 | 0 | 0 | 1 |
| 1 | 1 | 1 | 1 | 1 | 1 |
| 1 | 1 | 1 | 1 | 1 | 1 |
| 1 | 0 | 0 | 0 | 0 | 1 |
|   | 0 | 0 | 0 | 0 |   |

F I G. 1 8

COMMUNICATION DEVICE FOR TRANSMITTING DATA BY USING MULTILEVEL CODING, AND COMMUNICATION SYSTEM

CROSS-REFERENCE TO RELATED APPLICATION

This application is based upon and claims the benefit of priority of the prior Japanese Patent Application No. 2020-129934, filed on Jul. 31, 2020, the entire contents of which are incorporated herein by reference.

FIELD

The embodiments discussed herein are related to a communication device for transmitting data by using multilevel coding, and a communication system.

BACKGROUND

Error corrections for correcting errors in data in communication systems have been widespread. An error correction is implemented by adding an error correction code to the end of a transmission frame. In particular, a communication device on the transmission side adds an error correction code to the end of a transmission frame including data. A communication device on the reception side detects whether there is an error in received data by using an error correction code. When an error is detected, the error correction code is used to correct the error.

In the meantime, the number of bits allocated to each symbol has been increasing to allow communication systems to have a larger capacity. However, when many bits are allocated to each symbol, there will be many signal points at which the symbols could be located, and the distances between the signal points will be short. Hence, an error will easily occur. For example, an error could easily occur at the least significant bit (i.e., LSB) of a plurality of bits allocated to each symbol.

Accordingly, multilevel coding may be performed in a communication system in which many bits are allocated to each symbol. As a general rule, a plurality of coding schemes with different correction capabilities are used in multilevel coding. Multilevel coding can be performed for a bit at which an error tends to occur, thereby improving both data reliability and bandwidth use efficiency.

A proposed configuration is such that a circuit size is reduced and power consumption is decreased, irrespective of the modulation level of a modulation scheme (e.g., International Publication Pamphlet No. WO 2008/038749).

Communication capacity has been required to be further increased. For example, a 400-Gbps channel may be required to be replaced with an 800-Gbps channel. This requirement may be satisfied by, for example, increasing the number of bits allocated to each transmission symbol. Specifically, a policy of implementing an 800-Gbps channel by replacing a 16 quadrature amplitude modulation (16 QAM) transmission with a 32 QAM transmission has been considered.

In 32 QAM, five bits are allocated to each symbol. A transmission symbol is disposed, in accordance with the values of five bits allocated to the symbol, at any of two-dimensionally arranged 32 signal points P1-P32 depicted in FIG. 1. The power of the transmission symbol is dependent on the distance from the origin to the signal point on the constellation. Thus, it is not preferable to use points X1-X4.

However, for a situation in which multilevel coding is used in a communication system that transmits a 32 QAM symbol, it is not determined for which bit of the five bits a coding scheme with a high correction capability is to be used. In this regard, coding schemes with a high correction capability typically involve large power consumption. Especially when a decoding device recovers data by performing iterative processing using soft decision information, the iterative processing will consume a large amount of power. Hence, when multilevel codes are used in a communication system that transmits 32 QAM symbols, use of the prior art may lead to large power consumption of the communication system.

SUMMARY

According to an aspect of the embodiments, a communication system in which data is transmitted from a first communication device to a second communication device with 32 QAM allocating five bits to each symbol. The first communication device includes: a modulator configured to generate a modulated signal by mapping each symbol in a data frame that includes the data, a first code, and a second code to a signal point among two-dimensionally arranged signal points specific to 32 QAM; a first encoder configured to encode the data by using a first coding scheme so as to generate the first code; and a second encoder configured to encode, by using a second coding scheme different from the first coding scheme, a bit string formed from one specified bit in five bits allocated to each symbol in the data frame so as to generate the second code. The second communication device includes a decoder unit configured to perform, for the modulated signal, a decoding process based on the first coding scheme and a decoding process based on the second coding scheme so as to recover the data. The modulator performs mapping such that each pair of signal points adjacent to each other in any of directions of coordinate axes in two-dimensional coordinates in which 32 signal points corresponding to 32 QAM are arranged are different from each other in terms of a value of the one specified bit among the five bits.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a communication system in accordance with embodiments of the invention;

FIGS. 6A-6D illustrate an example of coding in a communication system depicted in FIG. 4;

FIG. 11 illustrates a mapping rule depicted in FIG. 10 separately for each bit;

FIG. 14 is a flowchart illustrating an example of operations of a receiver;

FIG. 18 illustrates a mapping rule depicted in FIG. 17 separately for each bit.

DESCRIPTION OF EMBODIMENTS

Figure 1:
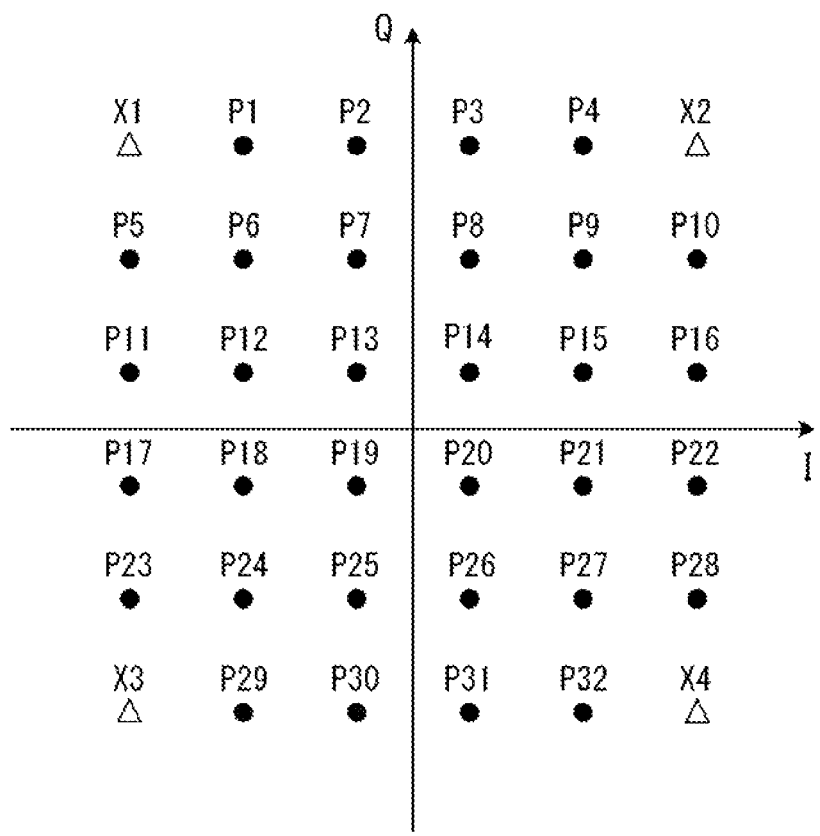
FIG. 1 is an explanatory diagram for signal points of 32 QAM.

FIG. 2 illustrates an example of a communication system in accordance with embodiments of the invention. The communication system 100 includes a plurality of communication devices 1 (1A, 1B).

The communication device 1 includes a digital signal processor (DSP) 2 and an optical transceiver 3. The DSP 2 generates data to be transmitted to another communication device. The DSP 2 processes data received by the communication device 1 from another communication device. The optical transceiver 3 includes a transmitter 4 and a receiver 5. The transmitter 4 transmits data generated by the DSP 2 to another communication device. The transmitter 4 includes an encoder for encoding transmission data. The receiver 5 receives data transmitted from another communication device. The receiver 5 includes a decoder for decoding received data.

The communication system 100 transmits an optical signal with quadrature amplitude modulation. In quadrature amplitude modulation, a plurality of bits are allocated to each symbol. For example, four bits may be allocated to each symbol in 16 QAM, and five bits may be allocated to each symbol in 32 QAM. Note that QAM may be referred to as quadrature phase amplitude modulation.

In the communication system 100, transmission data is encoded using multilevel codes. A plurality of codes with different error correction capabilities are used in multilevel coding. In this example, Bose-Chaudhuri-Hocquenghem (BCH) codes and low-density parity-check (LDPC) codes are used. BCH code typically has a moderately high error correction capability but involves low power consumption. An LDPC code typically has a high error correction capability and is thus effective for a path with large noise but tends to cause a decoder circuit to consume high power. The following descriptions are based on the assumption that LDPC codes have a higher error correction capability than BCH codes.

Figure 3:
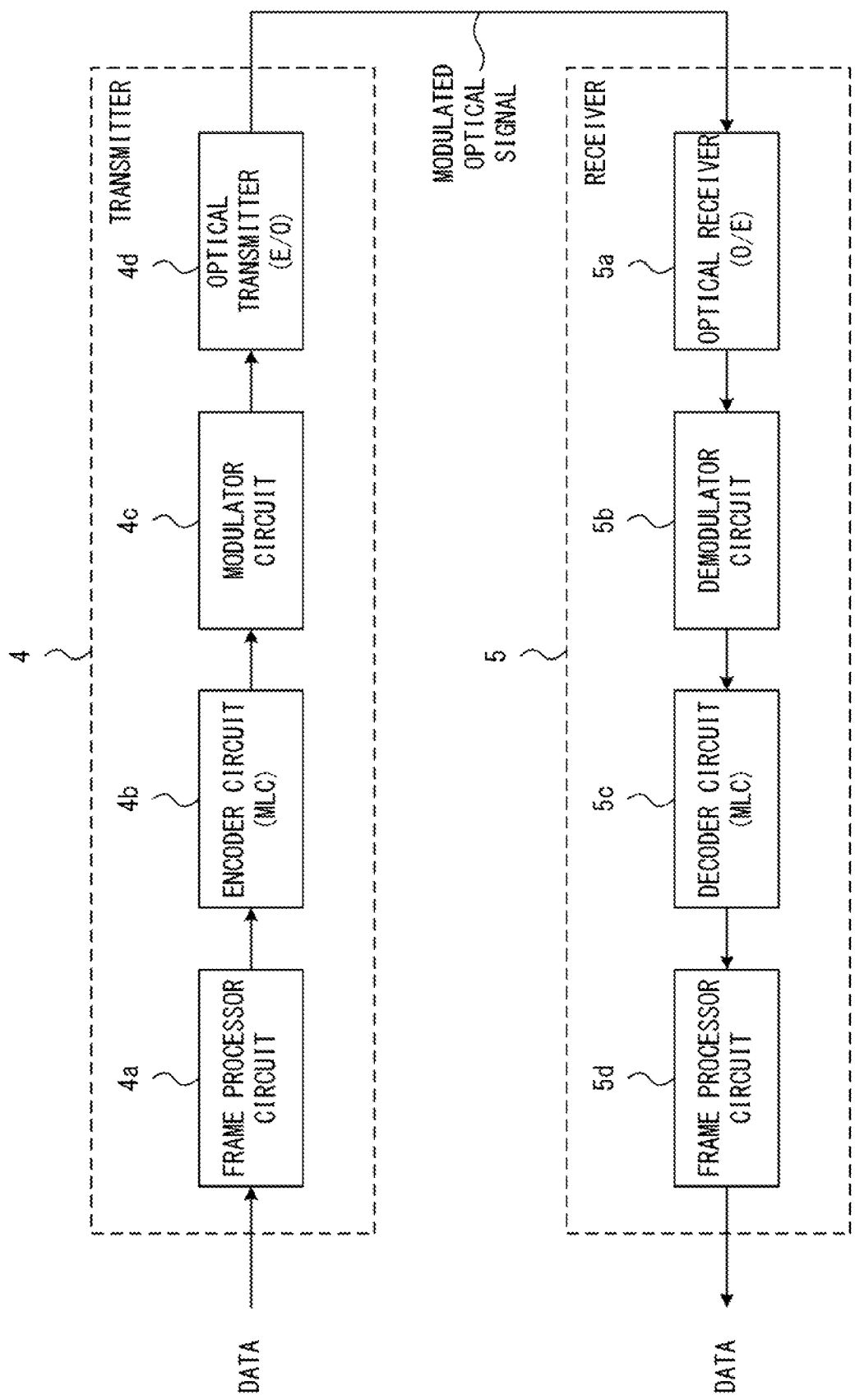
FIG. 3 illustrates a configuration example of a communication system.

FIG. 3 illustrates a configuration example of the communication system 100. The transmitter 4 and the receiver 5 depicted in FIG. 3 may be implemented in each of the communication devices 1A and 1B in the communication system 100 depicted in FIG. 2.

The transmitter 4 includes a frame processor circuit 4a, an encoder circuit 4b, a modulator circuit 4c, and an optical transmitter 4d. The frame processor circuit 4a stores data generated by an application in a specified frame. For example, the specified frame may be, but is not particularly limited to, an optical transport network (OTN) frame. The encoder circuit 4b encodes a bit string stored in a frame. In this case, the encoder circuit 4b performs multilevel coding. The modulator circuit 4c maps, for each symbol, a bit string encoded by the encoder circuit 4b to a corresponding signal point among two-dimensionally arranged signal points. The modulator circuit 4c may have an equalizer (e.g., pre-equalization) function. The optical transmitter 4d generates a modulated optical signal in accordance with a signal point determined by the modulator circuit 4c.

The receiver 5 includes an optical receiver 5a, a demodulator circuit 5b, a decoder circuit 5c, and a frame processor circuit 5d. The optical receiver 5a converts a received optical signal into an electric signal. In this case, the optical receiver 5a may generate electric field information indicating the received optical signal. The demodulator circuit 5b demodulates a received signal. The demodulator circuit 5b may have an equalizer function. The decoder circuit 5c decodes the signal demodulated by the demodulator circuit 5b. In this case, the decoder circuit 5c performs a decoding process corresponding to multilevel coding performed by the encoder circuit 4b. The decoder circuit 5c performs an error correction. The frame processor circuit 5d processes a received frame.

Figure 4:
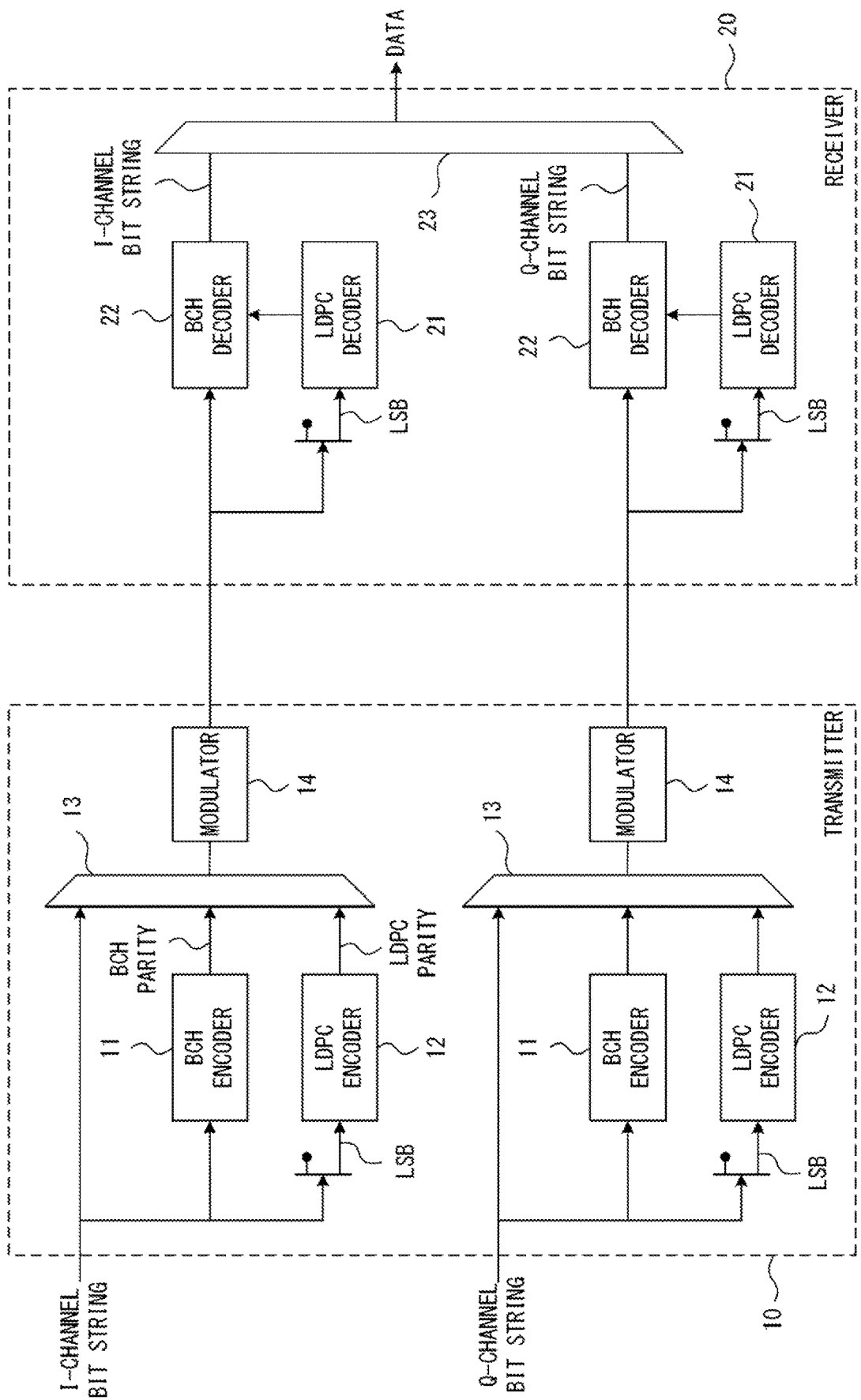
FIG. 4 illustrates an example of a transmitter and a receiver.

FIG. 4 illustrates an example of the transmitter and the receiver used in the communication system 100. The transmitter 10 and the receiver 20 depicted in FIG. 4 respectively correspond to the transmitter 4 implemented in the communication device 1A and the receiver 5 implemented in the communication device 1B in the communication system 100 depicted in FIG. 2.

Figure 5A:
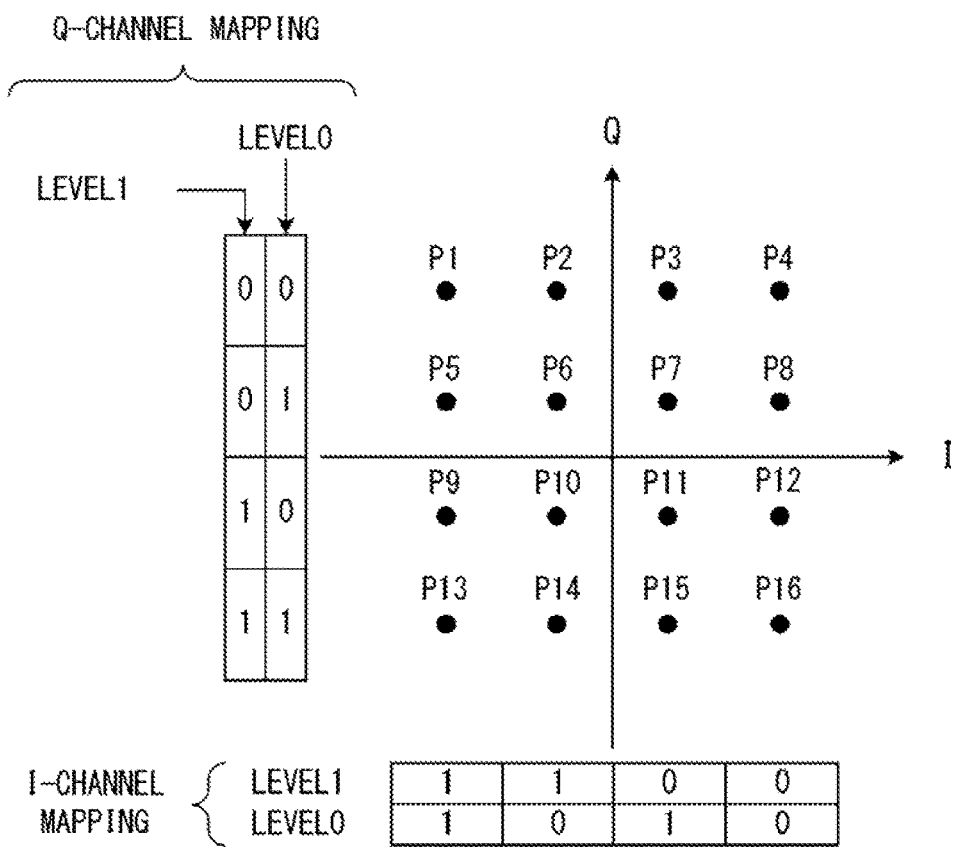
FIGS. 5A and 5B illustrate an example of mapping in a communication system depicted in FIG. 4.
Figure 5B:
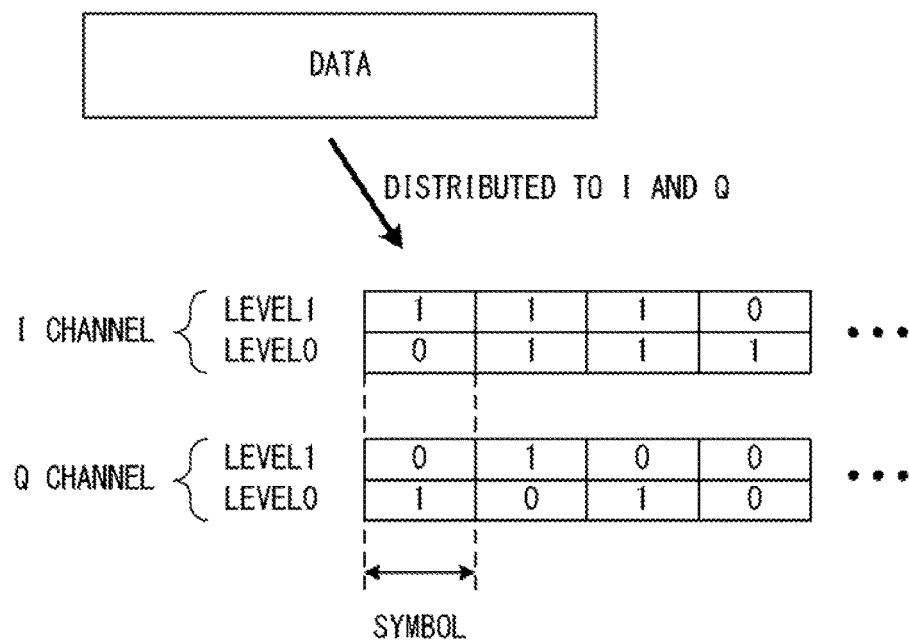

FIGS. 5A and 5B illustrate an example of mapping in the communication system depicted in FIG. 4. The transmitter 10 transmits data with quadrature amplitude modulation. In this example, the transmitter 10 transmits data with 16 QAM. In 16 QAM, four bits are allocated to each symbol. Thus, each symbol carries four bits. Accordingly, 16 QAM uses 16 signal points depicted in FIG. 5A. A transmission symbol is mapped to a signal point corresponding to a 4-bit value forming the symbol. In this case, four bits of data are transmitted using a pair of channels (I and Q) orthogonal to each other. In particular, as depicted in FIG. 5B, two of four bits indicating each symbol are allocated to the I channel, and the remaining two bits are allocated to the Q channel. Data transmitted using the I channel may hereinafter be referred to as an I-channel bit string. Data transmitted using the Q channel may hereinafter be referred to as a Q-channel bit string.

Assume, for example, that four bits allocated to a transmission symbol is "1001," as depicted in FIG. 5B and that the high two bits "10" are allocated to the I channel and the low two bits "01" are allocated to the Q channel. In this case, mapping is performed for each of the I channel and the Q channel. In the example depicted in FIG. 5A, a signal point P2, P6, P10, or P14 is selected when the data of the I channel is "10." The signal point P5, P6, P7, or P8 is selected when the data of the Q channel is "01." Thus, the transmission symbol is mapped to the signal point P6 selected by both the data of the I channel and the data of the Q channel. In this case, the symbol "1001" is transmitted using a phase and an amplitude that correspond to the signal point P6.

As described above, the transmitter 10 separately processes an I-channel bit string and a Q-channel bit string. Accordingly, as depicted in FIG. 4, the transmitter 10 includes, for each of the channels, a BCH encoder 11, an LDPC encoder 12, a frame generator 13, and a modulator 14.

FIGS. 6A-6D illustrate an example of coding in the communication system depicted in FIG. 4. As depicted in FIG. 6A, transmission data is separated into an I-channel bit string and a Q-channel bit string and supplied to the transmitter 10. The bit string of each channel is formed from an L0 bit string (i.e., LSB bit string) and an L1 bit string (i.e., MSB bit string).

As depicted in FIG. 6B, the BCH encoder 11 generates a BCH parity by performing BCH coding for an L0 bit string and an L1 bit string. The BCH parity is an example of a BCH code. As depicted in FIG. 6C, the LDPC encoder 12 generates an LDPC parity by performing LDPC coding for an L0 bit string. The LDPC parity is an example of an LDPC code.

The frame generator 13 generates a transmission data frame by adding a BCH parity and an LDPC parity to input bit strings. In this case, as depicted in FIG. 6D, the LDPC parity is added to an L0 bit string. The BCH parity is added to an L1 bit string. The modulator 14 maps each of the symbols in the data frame output from the frame generator 13 to a corresponding signal point. The mapping follows the rule indicated in FIG. 5A.

The transmitter 10 determines one signal point in accordance with the mapping for the I channel and the mapping for the Q channel. The transmitter 10 transmits a symbol by means of the determined signal point. An optical signal output from the transmitter 10 is transmitted to the receiver 20 via an optical transmission line. Although FIG. 4 illustrates that the I channel and the Q channel are separated from each other, a 16 QAM signal obtained by combining the I channel and the Q channel will be transmitted.

The receiver 20 includes an LDPC decoder 21, a BCH decoder 22, and a frame generator 23. As with the transmitter 10, the receiver 20 performs a decoding process for each of the I channel and the Q channel.

The LDPC decoder 21 performs LDPC decoding for a received signal. LDPC decoding is performed for an L0 bit string. As a result, the L0 bit string will be recovered. The BCH decoder 22 performs BCH decoding for the received signal by using the L0 bit string recovered by the LDPC decoder 21. As a result, the L0 bit string and an L1 bit string will be recovered. These decoding processes are performed for each of the channels. Thus, an I-channel bit string and a Q-channel bit string are recovered. Then, transmission data is recovered from the I-channel bit string and the Q-channel bit string.

As described above, in the communication system 100, data is transmitted by means of multilevel coding. Note that when deciding symbols, an error tends to occur in LSBs (L0 bits in this example) more easily than in MSBs (L1 bits in this example).

Figure 7:
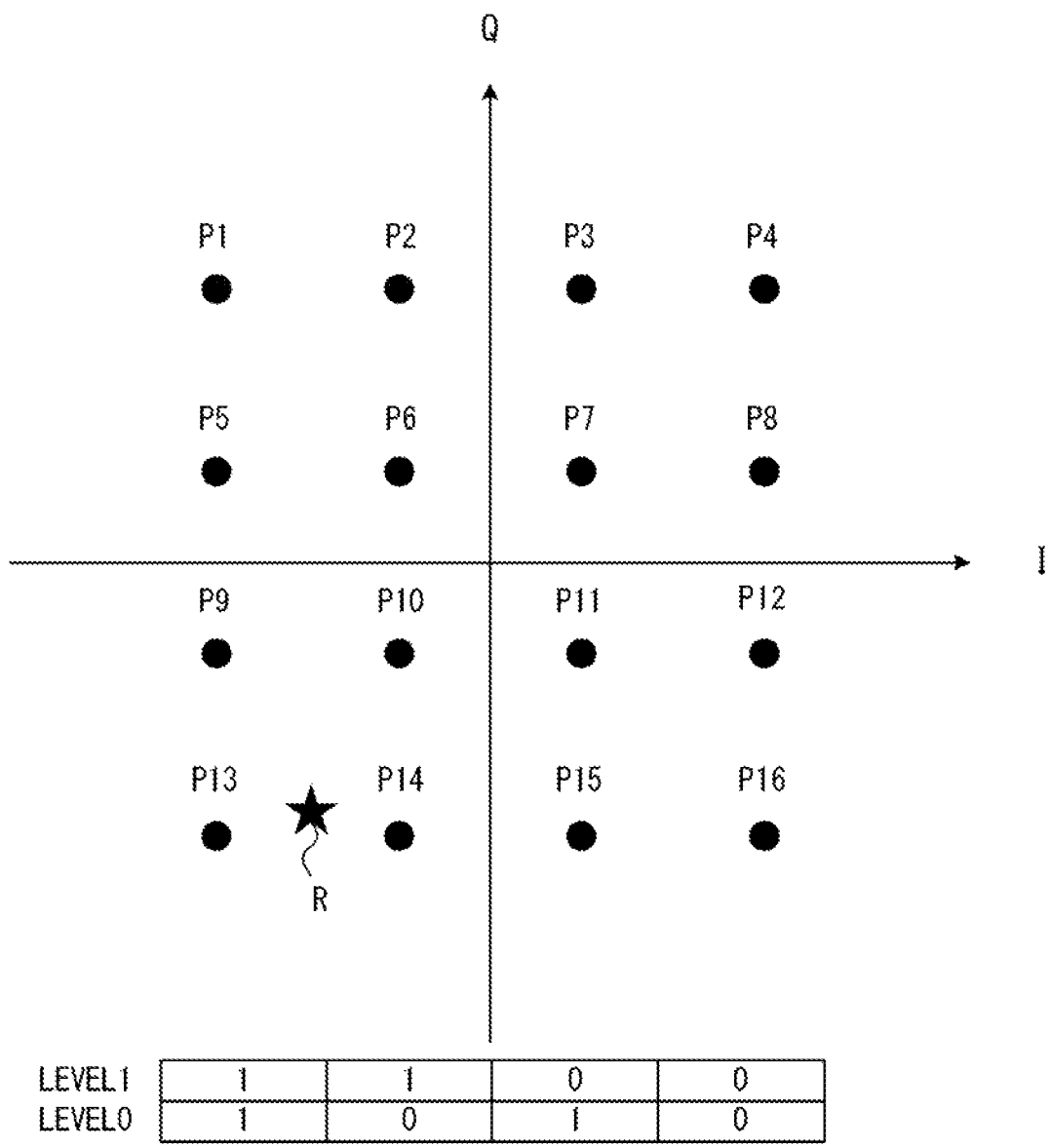
FIG. 7 illustrates an example of a decision process performed by a receiver depicted in FIG. 4.

FIG. 7 illustrates an example of a decision process performed by the receiver depicted in FIG. 4. Assume, for example, that a symbol transmitted from the transmitter 10 by using the signal point P13 indicated in FIG. 7 has been detected at a reception point R by the receiver 20. In this case, the receiver 20 decides data allocated to the received symbol by detecting the closest signal point to the reception point R. For example, in the decision for the I channel, the distance between the reception point R and the signal point P13 may be compared with the distance between the reception point R and the signal point P14. Assume that the incorrect decision result (i.e., signal point P14) is obtained. In this case, even though the transmission data of the I channel is "11," the receiver 20 will recover "10." That is, the LSB is incorrect. However, both of the MSBs of the signal points P13 and P14 are "1," and an error will not occur. Thus, an error tends to occur at the LSB more easily than the other bits (in this case, MSB).

Accordingly, multilevel coding is such that a coding scheme with a high error correction capability is used for a bit string in which an error tends to occur. Thus, an LDPC code is used for an LSB bit string. Hence, data reliability is enhanced.

However, coding schemes with a high correction capability typically involve large power consumption. For example, data encoded by LDPC codes may preferably be recovered through iterative processing using soft decision information. The iterative processing involves large power consumption.

The transmitter 10 depicted in FIG. 4 performs coding for each of the I channel and the Q channel. The receiver 20 depicted in FIG. 4 performs decoding for each of the I channel and the Q channel. Hence, for example, the communication system 100 using 16 QAM may perform LDPC coding for one of two bits for the I channel and perform LDPC coding for one of two bits for the Q channel. Thus, LDPC coding is performed for two of four bits allocated to each symbol, thereby increasing power consumption.

Embodiments

Figure 8:
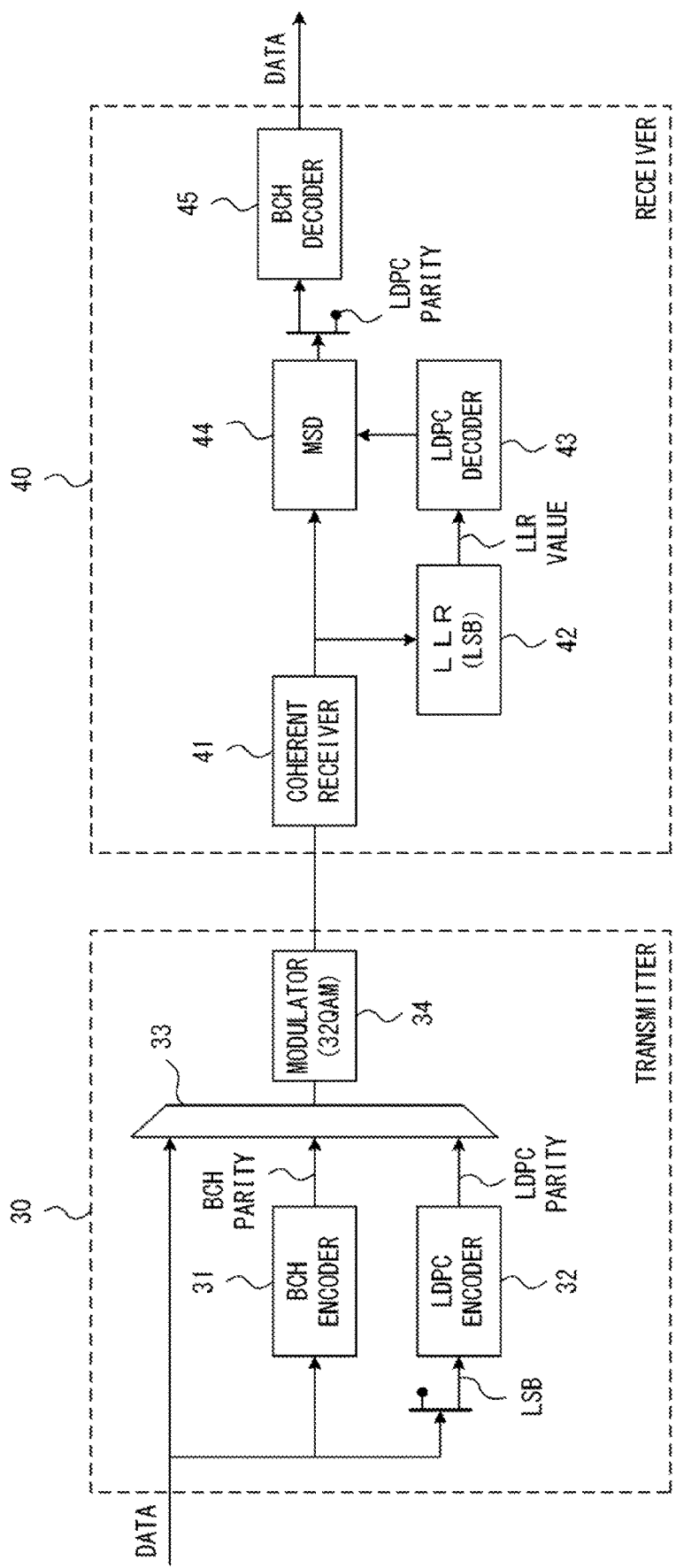
FIG. 8 illustrates an example of a transmitter and a receiver in accordance with embodiments of the invention.

FIG. 8 illustrates an example of a transmitter and a receiver in accordance with embodiments of the invention. The transmitter 30 and the receiver 40 depicted in FIG. 8 respectively correspond to the transmitter 4 implemented in the communication device 1A and the receiver 5 implemented in the communication device 1B in the communication system 100 depicted in FIG. 2. In this example, the transmitter 30 transmits data with 32 QAM. In 32 QAM, five bits are allocated to each symbol. Thus, each symbol carries five bits.

The transmitter 30 includes a BCH encoder 31, an LDPC encoder 32, a frame generator 33, and a modulator 34.

Note that the BCH encoder 31 and the LDPC encoder 32 correspond to the encoder circuit 4b depicted in FIG. 3. Although the transmitter 10 depicted in FIG. 4 includes two BCH encoders 11, two LDPC encoders 12, two frame generators 13, and two modulators 14, the transmitter 30 in accordance with embodiments of the invention includes one BCH encoder 31, one LDPC encoder 32, one frame generator 33, and one modulator 34.

Operations of the BCH encoder 31, the LDPC encoder 32, the frame generator 33, and the modulator 34 are almost the same as those of the BCH encoders 11, the LDPC encoders 12, the frame generators 13, and the modulators 14 depicted in FIG. 4. However, while the configuration depicted in FIG. 4 is such that the I channel and the Q channel are individually coded, embodiments of the present invention are such that transmission data is coded without being divided into an I channel and a Q channel.

Figure 9A:
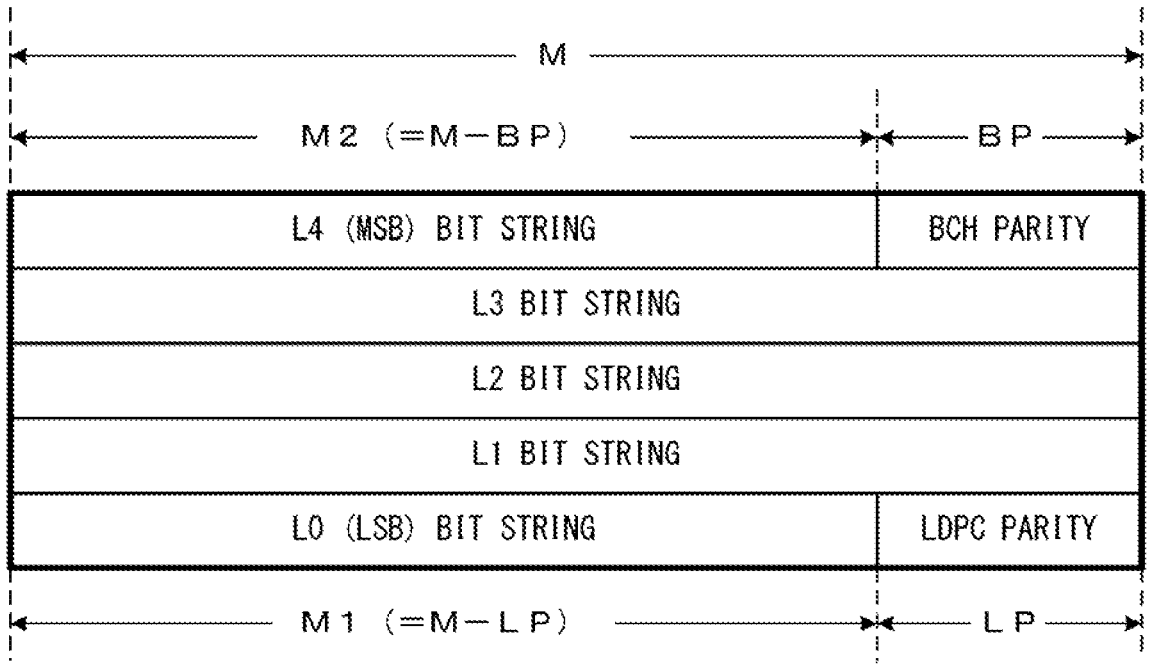
FIGS. 9A-9C illustrate an example of coding in accordance with embodiments of the invention.
Figure 9B:
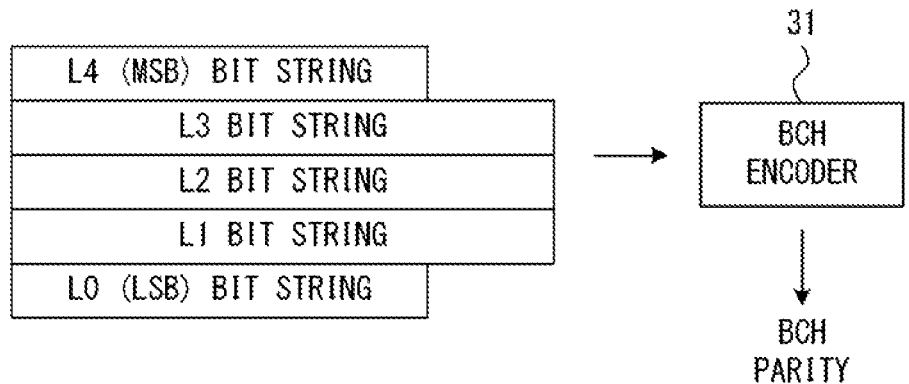
Figure 9C:
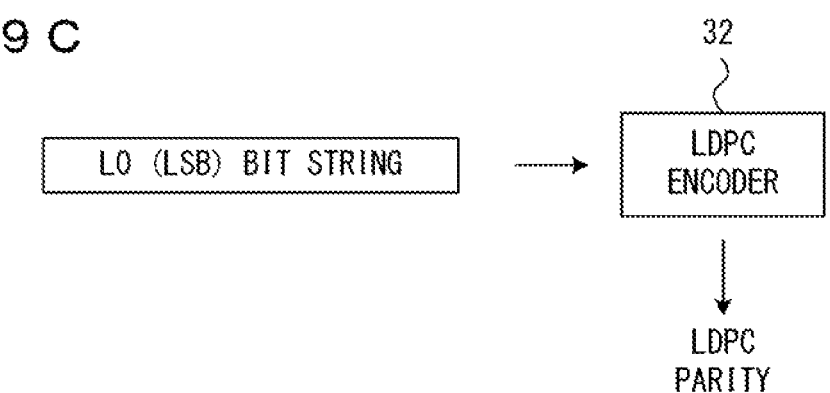

FIGS. 9A-9C illustrate an example of coding in accordance with embodiments of the invention. For example, although not particularly limited, transmission data may be stored in a data frame depicted in FIG. 9A and transmitted from the transmitter 30 to the receiver 40. Since 32 QAM transmits five bits per symbol, the data frame is formed from five-bit levels (L0-L4). The length of the data frame is M symbols.

Transmission data is stored in a level L0 region to a level L4 region. However, LDPC parity bits are stored in a portion of the level L0 (LSB) region. When the length of the LDPC parity bits is LP bits, (M-LP) bits of data are stored in the level L0 region. BCH parity bits are stored in a portion of the level L4 (MSB) region. When the length of the BCH parity bits is BP bits, (M-BP) bits of data are stored in the level L4 region. Thus, the data frame stores (5M-LP-BP) bits of transmission data.

Accordingly, when transmission data generated by an application is greater than (5M-LP-BP) bits, the transmission data will be supplied (5M-LP-BP) bits at a time to the transmitter 30. When transmission data is less than (5M-LP-BP) bits, a dummy bit or padding may be added to the transmission data. The data input to the transmitter 30 is guided to the BCH encoder 31, the LDPC encoder 32, and the frame generator 33.

The BCH encoder 31 generates a BCH parity by performing BCH coding for transmission data. In particular, as depicted in FIG. 9B, the BCH encoder 31 generates a BCH parity by performing BCH coding for an L0 (LSB) bit string, an L1 bit string, an L2 bit string, an L3 bit string, and an L4 (MSB) bit string. Note that a code rate may be determined in advance. The BCH parity is an example of a BCH code. For example, the BCH encoder 31 may be implemented by a digital circuit that generates a BCH parity by performing BCH coding for an input bit string. However, the BCH encoder 31 may be implemented by a processor executing a software program.

The LDPC encoder 32 generates an LDPC parity by encoding a bit string formed from a specified bit among five bits allocated to each symbol in transmission data. For example, the specified bit may be a least significant bit (LSB). In this case, as depicted in FIG. 9C, the LDPC encoder 32 generates an LDPC parity by performing LDPC coding for an L0 (LSB) bit string. Note that the code rate may be determined in advance. The LDPC parity is an example of an LDPC code. For example, the LDPC encoder 32 may be implemented by a digital circuit that generates an LDPC parity by performing LDPC coding for the L0 (LSB) bit string in transmission data. However, the LDPC encoder 32 may be implemented by a processor executing a software program.

The frame generator 33 generates a data frame including transmission data (L0-L4 bit strings), a BCH parity, and an LDPC parity. Accordingly, the data frame depicted in FIG. 9A is generated from transmission data, a BCH parity, and an LDPC parity. In this case, the LDPC parity generated for the L0 (LSB) bit string is stored in the level L0 region. Thus, the LDPC parity is transmitted using the LSB. The BCH parity is stored in a region other than the level L0 region. Thus, the BCH parity is transmitted using a bit other than the L0 bit. In this example, the BCH parity is transmitted using the L4 (MSB) bit. The frame generator 33 is implemented by a digital circuit that generates data frames in the above-described manner. However, the frame generator 33 may be implemented by a processor executing a software program.

Figure 10:
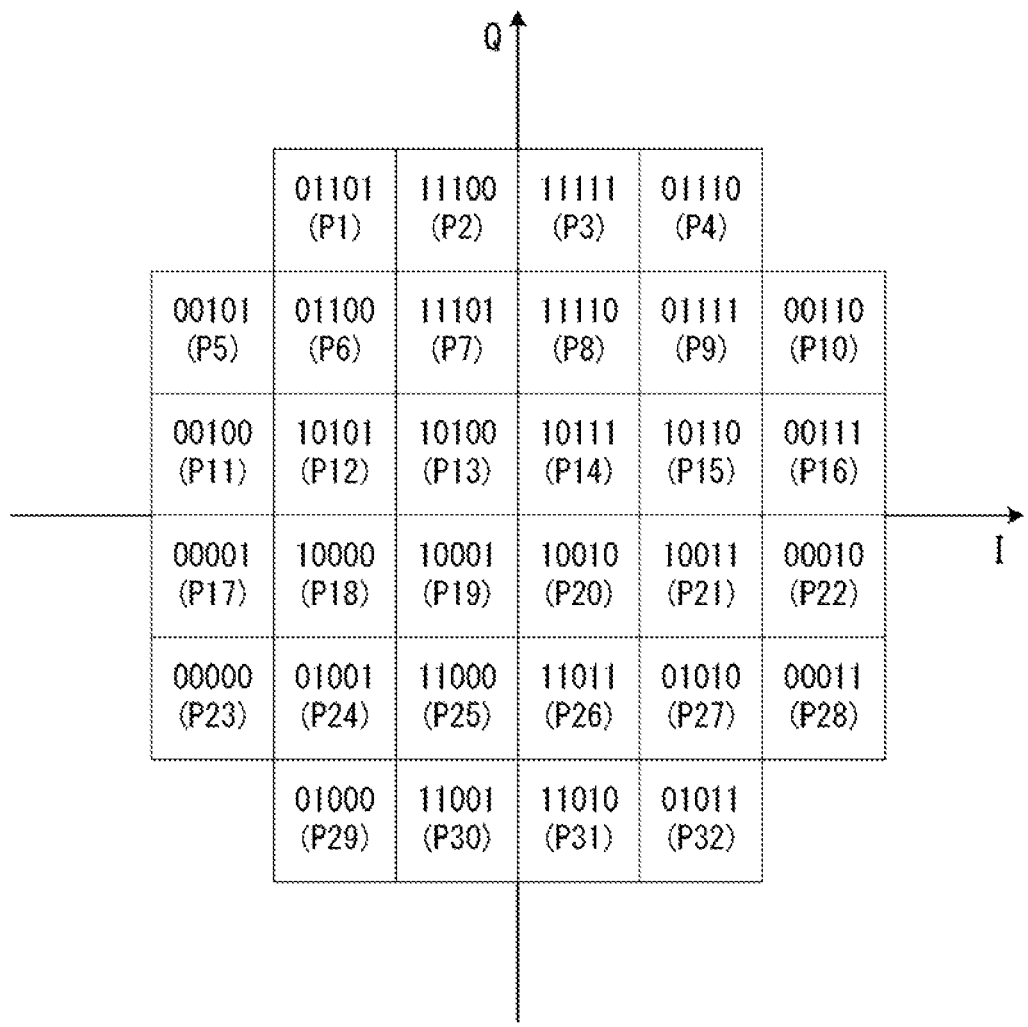
FIG. 10 illustrates an example of a mapping rule for 32 QAM.

FIG. 10 illustrate an example of a mapping rule according to 32 QAM. FIG. 11 illustrates the mapping rule depicted in FIG. 10 separately for each bit. The modulator 34 generates a modulated signal by mapping the symbols in a data frame generated by the frame generator 33 to signal points of 32 QAM. In particular, in accordance with the mapping rule depicted in FIGS. 10 and 11, transmission symbols are two-dimensionality mapped to signal points each corresponding to a five-bit value forming a symbol. For example, a transmission symbol formed from five bits of "00101" may be mapped to the signal point P5. A transmission symbol formed from five bits of "10101" may be mapped to the signal point P12. In this example, a left end bit is an MSB (L4 bit), and a right end bit is an LSB (L0 bit).

As indicated in FIGS. 10 and 11, the modulator 34 performs mapping such that each pair of adjacent signal points are different from each other in terms of the values of L0 bits on the constellation. That is, values of L0 bits of arbitrary adjacent signal points are different from each other. For example, the signal points P5 and P6 are adjacent to each other in an I-axis direction. The LSB of a symbol mapped to the signal point P5 is "1," and the LSB of a symbol mapped to the signal point P6 is "0." The signal points P5 and P11 are adjacent to each other in a Q-axis direction. The LSB of a symbol mapped to the signal point P5 is "1," and the LSB of a symbol mapped to the signal point P11 is "0." In this way, the modulator 34 performs mapping such that each pair of signal points adjacent to each other in any of the directions of coordinate axes in the two-dimensional coordinates in which 32 signal points corresponding to 32 QAM are arranged are different from each other in terms of the value of one specified bit (least significant bit in examples) among five bits forming a symbol.

For the other bits (L1-L4), as depicted in FIGS. 10 and 11, mapping is performed such that the values are equal as much as possible between adjacent signal points. For example, for the L1 (level 1) bits, signal-point values belonging to the three columns on the left side may be "0," and signal-point values belonging to the three columns on the right side may be "1." For the L2 (level 2) bits, signal-point values belonging to the three rows on the up side may be "1," and signal-point values belonging to the three rows on the down side may be "0." For the L1-L4 bits, it is also preferable that the values be equal as much as possible between signal points diagonally adjacent to each other.

The mapping indicated in FIGS. 10-11 is merely an example, and mapping may be performed using another rule. However, it is preferable that each pair of adjacent signal points be different from each other in terms of the values of bits for which LDPC coding is performed (LSB in this example), and that each pair of adjacent signal points be the same as much as possible in terms of the values of the other bits (L1-L4 in this example).

The modulator 34 generates, for each transmission symbol, an optical signal having an amplitude and a phase that correspond to a signal point to which the transmission symbol is mapped. The optical signal is transmitted to the receiver 40 via an optical transmission line. In the meantime, the modulator 34 includes a circuit for generating a drive signal representing a determined signal point and an optical modulator for generating an optical signal based on the drive signal.

Figure 12:
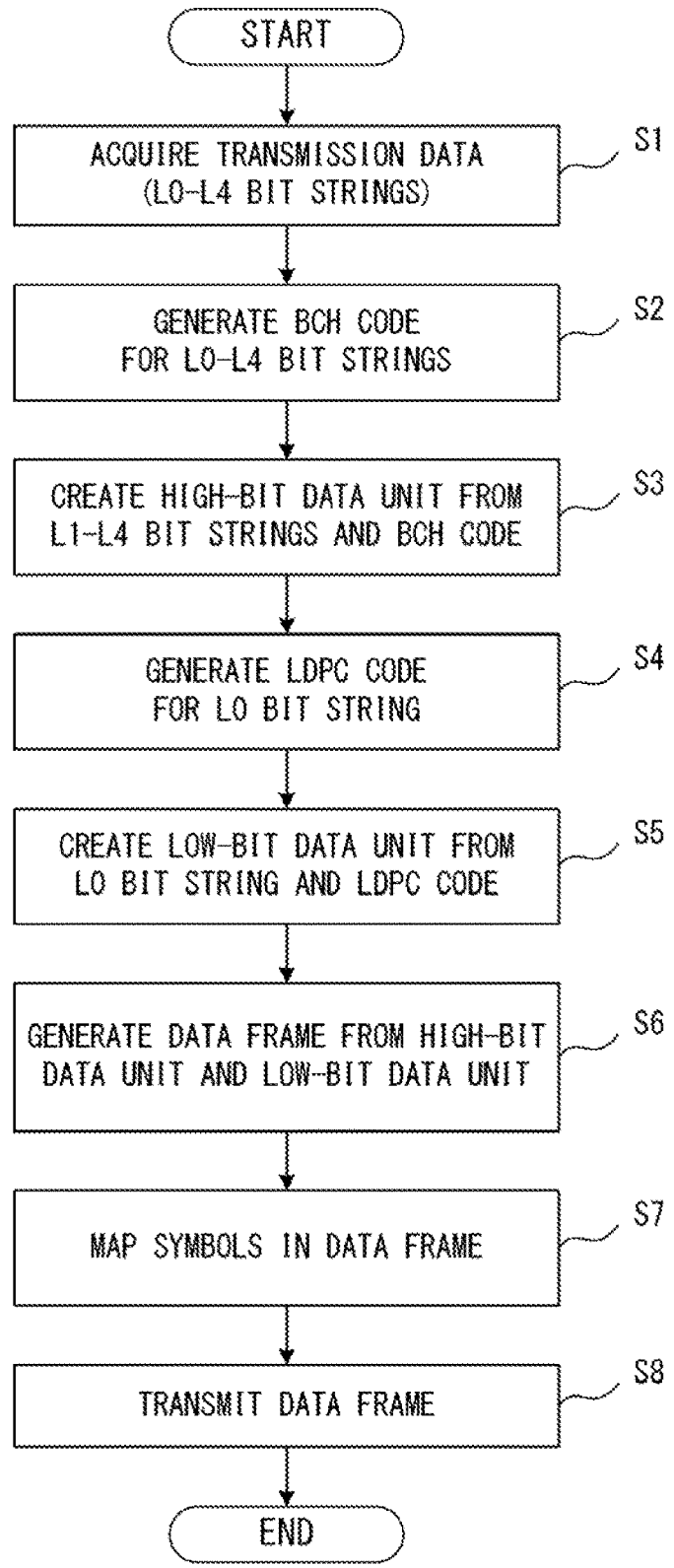
FIG. 12 is a flowchart illustrating an example of operations of a transmitter.

FIG. 12 is a flowchart illustrating an example of operations of the transmitter 30. The processes of this flowchart are performed when the communication device 1 has generated transmission data. Alternatively, the transmitter 30 may perform the processes of the flowchart depicted in FIG. 12 when probabilistic shaping (PS) is not performed.

In S1, the transmitter 30 acquires transmission data. The transmission data corresponds to the L0-L4 bit strings depicted in FIG. 9A. In S2, the BCH encoder 31 generates a BCH parity (or BCH code) by performing BCH coding for the L0-L4 bit strings. In S3, the frame generator 33 generates a high-bit data unit for a data frame from the L1-L4 bit strings and the BCH code. In particular, the frame generator 33 creates a level L1 region to a level L4 region for the data frame by storing the L1 bit string in the level L1 region, storing the L2 bit string in the level L2 region, storing the L3 bit string in the level L3 region, and storing the L4 bit string and the BCH parity in the level L4 region.

In S4, the LDPC encoder 32 generates an LDPC parity (or LDPC code) by performing LDPC coding for the L0 bit string. In S5, the frame generator 33 generates a low-bit data unit for the data frame from the L0 bit string and the LDPC code. In particular, the frame generator 33 creates a level L0 region for the data frame by storing the L0 bit string and the LDPC parity in the level L0 region.

In S6, the frame generator 33 generates the data frame from the high-bit data unit created through S2-S3 and the low-bit data unit created through S4-S5. In S7, the modulator 34 maps each of the symbols in the data frame to a corresponding signal point. In this case, for example, each of the symbols may be mapped to a corresponding signal point in accordance with the mapping rule depicted in FIGS. 10 and 11. In S8, the transmitter 30 sequentially transmits the symbols in the data frame.

The receiver 40 includes a coherent receiver 41, a log-likelihood-ratio (LLR) calculator 42, an LDPC decoder 43, a multi-stage decoder (MSD) 44, and a BCH decoder 45. The receiver 40 receives a data frame transmitted from the transmitter 30. The LLR calculator 42, the LDPC decoder 43, the multi-stage decoder 44, and the BCH decoder 45 correspond to the decoder circuit 5c depicted in FIG. 3. The coherent receiver 41 corresponds to the optical receiver 5a and the demodulator circuit 5b depicted in FIG. 3.

The coherent receiver 41 generates electric field information indicating a received optical signal. In particular, the coherent receiver 41 generates electric field information indicating the phases and amplitudes of received symbols. The coherent receiver 41 includes a local light source, a 90-degree optical hybrid circuit, a photo detector circuit, and the like. The coherent receiver 41 may have a function for compensating for dispersion in an optical transmission line, a function for compensating for the difference between the carrier frequency of an optical signal and the frequency of the local light source, and the like.

The LLR calculator 42 calculates the value of a log likelihood ratio (LLR) by performing a soft decision for a received signal. In particular, the LLR calculator 42 calculates the LLR values of received symbols. However, the LLR calculator 42 does not calculate LLR values for all bits of each of the received symbols but calculates LLR values only for the LSBs of the received symbols. Thus, in the case of the data frame depicted in FIG. 9A, an LLR value is calculated for the bits in the L0 (LSB) bit string and the LDPC parity.

An LLR value indicates the logarithm of the ratio between the probability that a received signal was "1" at a transmitter and the probability that the received signal was "0" at the transmitter. Thus, the LLR value is calculated according to reception electric field information indicating the phase and amplitude of a received symbol. In particular, the LLR value is calculated according to the distances between the received symbol and signal points (32 signal points in the case of 32 QAM). In the meantime, the LLR calculator 42 is implemented by, for example, a digital circuit that calculates an LLR value. In this case, the digital circuit may include a circuit for storing a relation between the electric field information and the LLR value of a received symbol. The LLR calculator 42 may also be implemented by a processor executing a software program.

The LDPC decoder 43 performs LDPC decoding based on a soft decision result output from the LLR calculator 42. In particular, the LDPC decoder 43 performs LDPC decoding by using the LLR value of the bits in the L0 (LSB) bit string and the LDPC parity. In this case, the LDPC decoder 43 performs, for example, probability propagation decoding. A probability propagation decoding algorithm includes iterative processing of updating the LLR value of the bits until a parity check is satisfied. Decision results obtained for the bits when the parity check is satisfied are output as decoding results. As a result, the bits in the L0 (LSB) bit string and the LDPC parity are recovered. Note that the probability propagation decoding algorithm may stop the iterative processing when the number of iterations has reached a specified maximum value. In this case, the bits in the L0 (LSB) bit string and the LDPC parity are decided according to the updated LLR value of the bits obtained when the number of iterations reaches the specified maximum value. The LDPC decoder 43 is implemented by, for example, a digital circuit that performs the decoding process. However, the LDPC decoder 43 may be implemented by a processor executing a software program.

The multi-stage decoder 44 demaps received symbols according to electric field information indicating received optical signals. In this case, the multi-stage decoder 44 converts each received symbol into five bits of data in accordance with the mapping rule depicted in FIG. 10. However, the L0 bit of the five bits forming each symbol has been decided by the LDPC decoder 43. Accordingly, the multi-stage decoder 44 demaps the received symbols by using decision results provided by the LDPC decoder 43.

Figure 13:
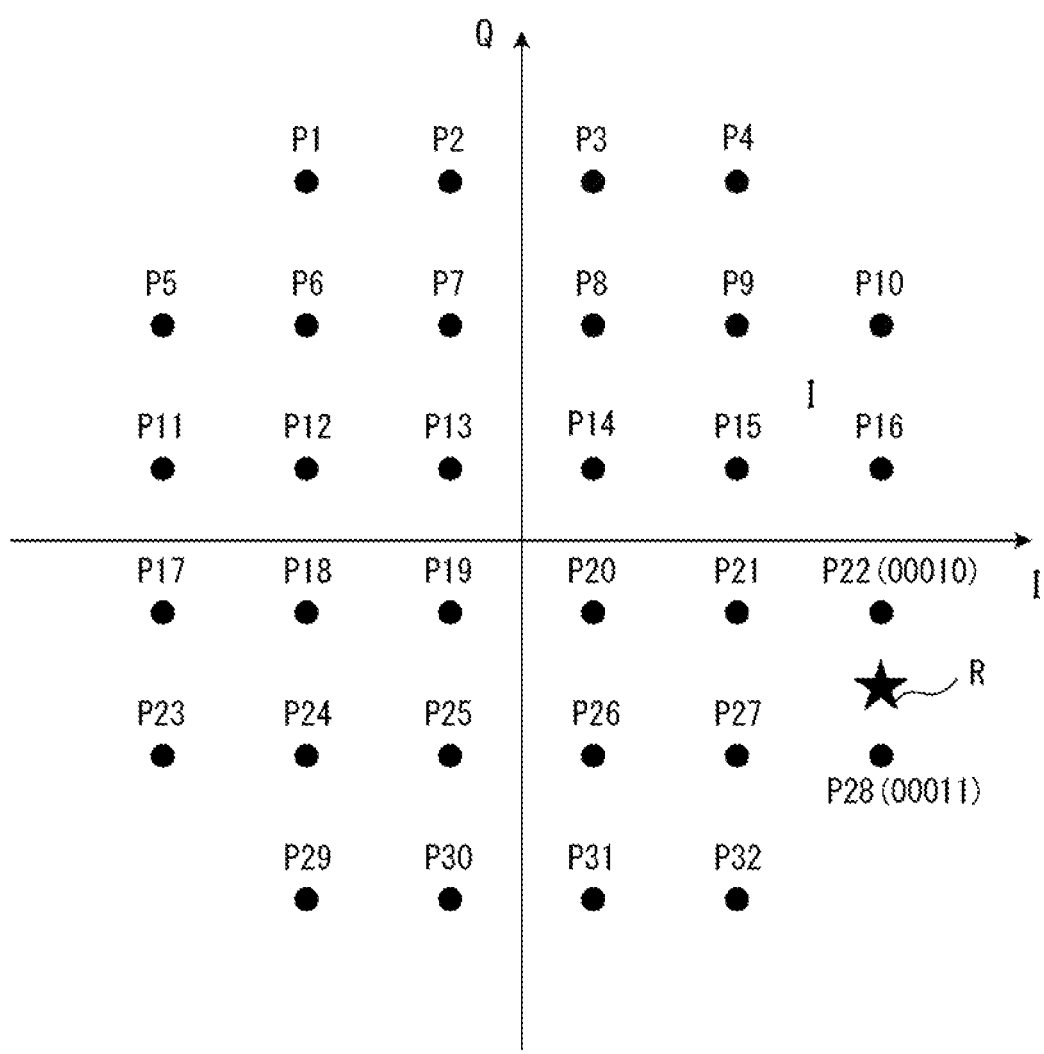
FIG. 13 illustrates an example of a detected received symbol.

FIG. 13 illustrates an example of a detected received symbol. Assume, for example, that a received symbol has been detected at the point R depicted in FIG. 13. In this case, the multi-stage decoder 44 detects the closest signal point to the reception point R so as to decide the signal point used by the transmitter 30. However, in this example, the distance between the reception point R and the signal point P22 and the distance between the reception point R and the signal point P28 are almost equal. Thus, an incorrect decision result could be obtained if a decision result provided by the LDPC decoder 43 is not used.

Accordingly, the multi-stage decoder 44 uses a decision result provided by the LDPC decoder 43. In this example, the decision result provided for a received symbol R by the LDPC decoder 43 is "0." That is, the least significant bit of the five bits corresponding to the received symbol is "0." Since the LDPC decoder 43 performs a parity check, the reliability of the decision result provided by the LDPC decoder 43 is high. Meanwhile, as depicted in FIGS. 10 and 13, the high four bits of the five bits corresponding to each of the signal points P22 and P28 are "0001." Thus, the decision result of the received symbol is "00010." In this example, high bits are mapped such that values are equal as much as possible between adjacent signal points, as described above by referring to FIG. 10. Hence, the probability of occurrence of an error in the abovementioned bits will be low.

The symbols in a data frame are decided in the manner described above. Specifically, the L0-L4 bit strings, the LDPC parity, and the BCH parity depicted in FIG. 9A are recovered.

The BCH decoder 45 performs BCH decoding for a decision result provided by the multi-stage decoder 44. However, the transmitter 30 generates a BCH parity for L0-L4 bit strings. Thus, an LDPC parity is discarded, and the BCH decoder 45 uses the BCH parity so as to check the L0-L4 bit strings output from the multi-stage decoder 44. In this case, any errors detected will be corrected. As a result, transmission data will be recovered. In the meantime, the BCH decoder 45 is implemented by, for example, a digital circuit that performs the decoding process. However, the BCH decoder 45 may be implemented by a processor executing a software program.

FIG. 14 is a flowchart illustrating an example of operations of the receiver 40. The receiver 40 receives an optical signal transmitted from the transmitter 30 depicted in FIG. 8.

In S11, the coherent receiver 41 generates electric field information for received symbols. The electric field information indicates the phases and amplitudes of the received symbols. In S12, the LLR calculator 42 performs a soft decision for each of the received symbols according to the electric field information indicating the received optical signal. In particular, the LLR values of the received symbols are calculated. However, the LLR calculator 42 may calculate LLR values only for the LSBs of the received symbols. In S13, the LDPC decoder 43 performs LDPC decoding based on a soft decision result output from the LLR calculator 42. As a result, the bits in an L0 bit string and an LDPC parity are recovered. In S14, the multi-stage decoder 44 demaps the received symbols according to the electric field information indicating the received optical signal. In this case, the multi-stage decoder 44 demaps the received symbols by using a decision result provided by the LDPC decoder 43. As a result, the bits in the L0-L4 bit strings and the BCH parity are recovered. In S15, the BCH decoder 45 uses the BCH parity so as to decode the L0-L4 bit strings output from the multi-stage decoder 44. In particular, error detection and error correction are performed for the L0-L4 bit strings by using the BCH parity. As a result, the transmission data is recovered.

As described above, in embodiments of the invention, iterative processing using soft decision information is performed only for one of five bits allocated to a 32 QAM symbol. In this regard, iterative processing using soft decision information involves large power consumption. Accordingly, embodiments of the invention have reduced power consumption in multilevel coding communication.

In one form of the prior art, a plurality of bits allocated to a QAM symbol are distributed to the I channel and the Q channel, as indicated in FIG. 4. However, in 32 QAM, five bits are allocated to each symbol. Thus, when transmitting 32 QAM symbols in the configuration depicted in FIG. 4, the bits allocated to each of the symbols cannot be distributed equally between the I channel and the Q channel.

Figure 15:
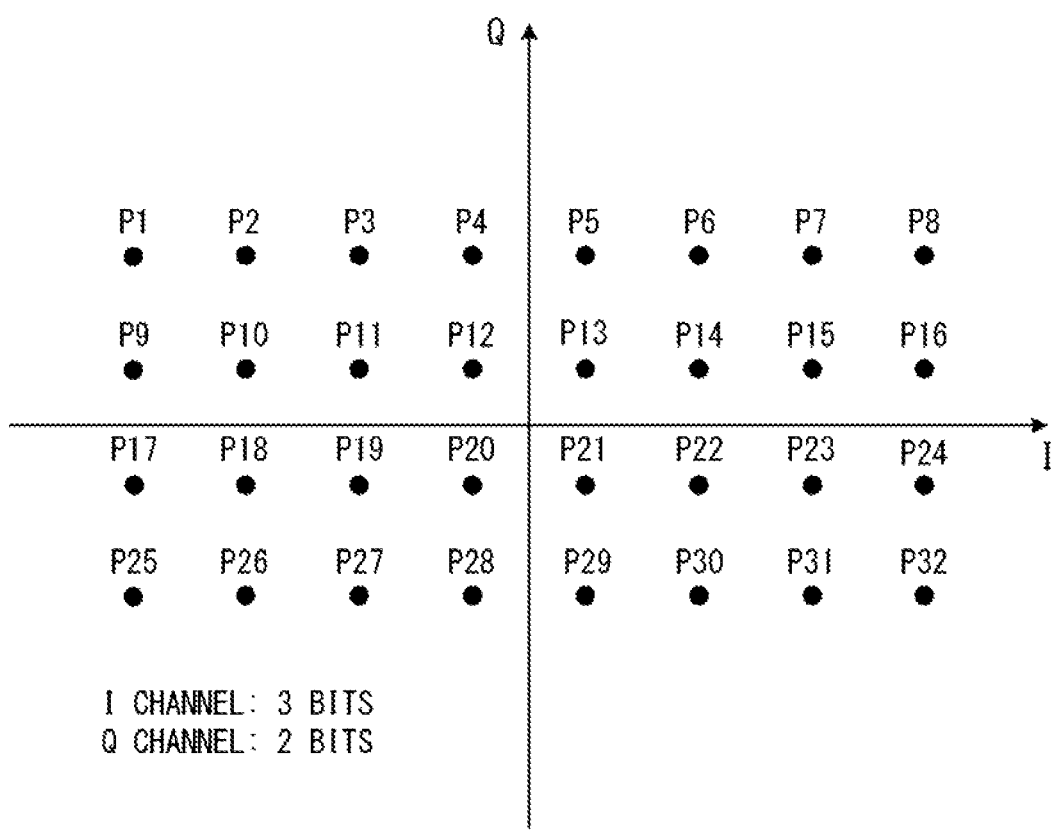
FIG. 15 illustrates an example of a method for encoding a 32 QAM symbol by separating this symbol into an I channel and a Q channel.

FIG. 15 illustrates an example of a method for encoding a 32 QAM symbol by separating this symbol into an I channel and a Q channel. When, for example, three bits are distributed to the I channel and two bits are distributed to the Q channel, transmission symbols will be disposed at 32 signal points P1-P32 depicted in FIG. 15. In this example, the power of a transmission symbol is dependent on the distance from an origin to a signal point on a constellation. Thus, some signal points (e.g., P1, PB, P9, P16, P17, P24, P25, P32) will have large power. Hence, the scheme of performing encoding/decoding for each of the I channel and the Q channel will not be appropriate for a QAM transmission in which the number of bits allocated to each transmission symbol is an odd number.

For example, this problem may be solved by disposing the five bits of a 32 QAM symbol at a corresponding signal point by gray mapping and using a coding scheme with a high correction capability for each of the levels (i.e., L0-L4). However, use of a coding scheme with a high correction capability for all of the levels will lead to large power consumption in a decoding process.

In embodiments of the invention, mapping is performed such that each pair of adjacent signal points are different from each other in terms of the value of the LSB of the five bits allocated to a 32 QAM symbol. Thus, an error tends to occur most easily at the LSB of the five bits. A coding scheme with a high correction capability is used for the LSB. Hence, data reliability is high. Moreover, power consumption is reduced since a coding scheme with a high correction capability is used for a small number of bits.

Variation

In the examples depicted in FIGS. 9A-11, mapping is performed such that each pair of adjacent signal points are different from each other in terms of the value of the LSB of the five bits allocated to a 32 QAM symbol. In this regard, an error tends to occur when bit values are different between adjacent signal points. In particular, an error occurs more easily at an LSB than at other bits. Accordingly, a coding scheme with a high correction capability is used for the LSB.

However, according to the mapping rule depicted in FIGS. 10 and 11, each pair of signal points adjacent to each other in the I-axis direction or the Q-axis direction on the constellation are different from each other in terms of the value of the LSB, but each pair of diagonally adjacent signal points are the same in terms of the value of the LSB. For example, the LSB of a signal point P12 is "1." The LSBs of signal points P5, P7, P17, and P19 located diagonally to the upper left, upper right, lower left, and lower right of the signal point P12 are also "1." In this case, when, for example, a received symbol is detected at the midpoint between the signal points P5 and P12, the high bits (L1-L4) will be used to determine to which of the signal point P5 or P12 the symbol has been allocated by a transmitter. However, in the example depicted in FIGS. 9A-9C, high bits are not encoded using a coding scheme with a high correction capability. Accordingly, in the example depicted in FIGS. 9A-11, noise tolerance may be low for diagonal directions in the constellation coordinate system.

Figure 16A:
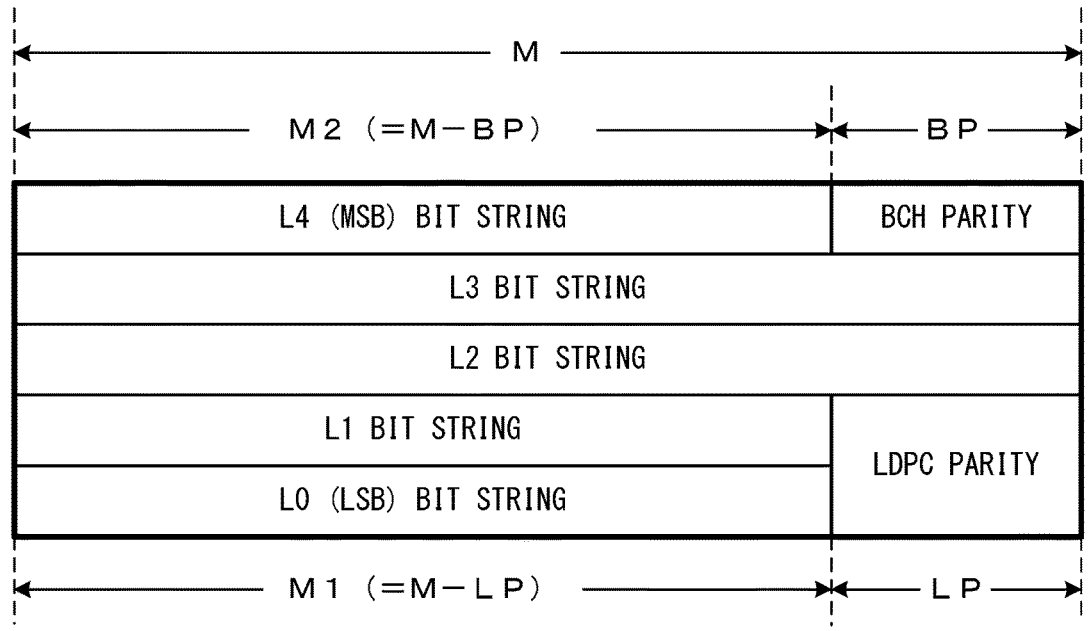
FIGS. 16A-16C illustrate a variation of coding in accordance with embodiments of the invention.
Figure 16B:
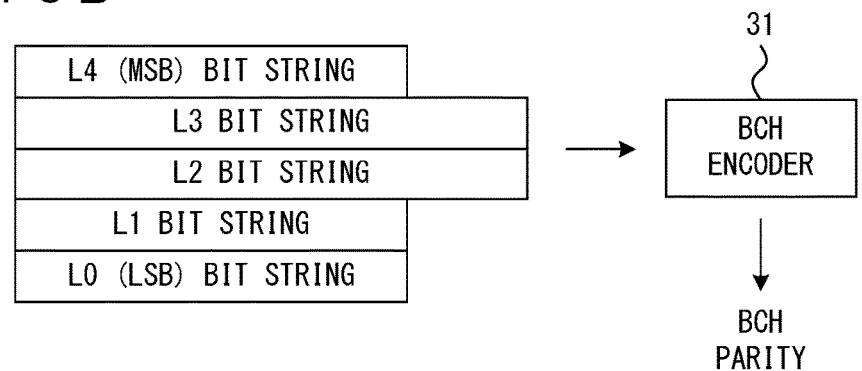
Figure 16C:
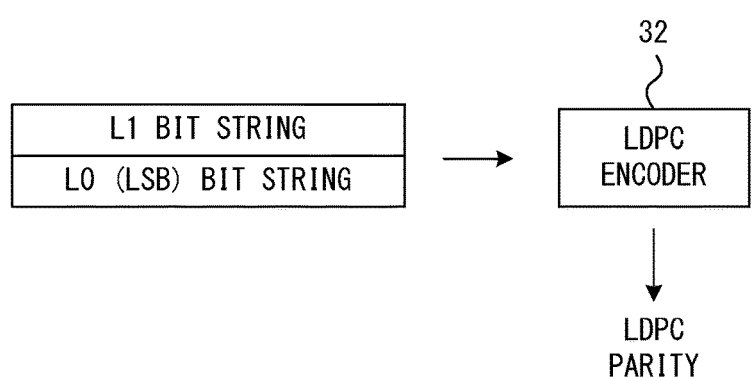

FIGS. 16A-16C illustrate a variation of coding in accordance with embodiments of the invention. In this example, transmission data is stored in a data frame depicted in FIG. 16A and transmitted from the transmitter 30 to the receiver 40. The transmission data is stored in a level L0 region to a level L4 region. However, LDPC parity bits are stored in portions of the level L0 region and the level L1 region. When the length of the LDPC parity bits is 2LP bits, (M-LP) bits of data are stored in each of the level L0 region and the level L1 region. BCH parity bits are stored in a portion of the level L4 region. When the length of the BCH parity bits is BP bits, (M-BP) bits of data are stored in the level L4 region. Thus, the data frame stores (5M-2LP-BP) bits of transmission data.

Accordingly, when transmission data generated by an application is greater than (5M-2LP-BP) bits, the transmission data will be supplied (5M-2LP-BP) bits at a time to the transmitter 30. When transmission data is less than (5M-2LP-BP) bits, a dummy bit or padding may be added to the transmission data. The data input to the transmitter 30 is guided to the BCH encoder 31, the LDPC encoder 32, and the frame generator 33.

As depicted in FIG. 16B, the BCH encoder 31 generates a BCH parity by performing BCH coding for an L0 (LSB) bit string, an L1 bit string, an L2 bit string, an L3 bit string, and an L4 (MSB) bit string. As depicted in FIG. 16C, the LDPC encoder 32 generates an LDPC parity by performing LDPC coding for the L0 (LSB) bit string and the L1 bit string. The frame generator 33 generates a data frame including transmission data (L0-L4 bit strings), a BCH parity, and an LDPC parity. In this case, the LDPC parity generated for the L0-L1 bit strings is stored in the level L0 region and the level L1 region. Meanwhile, the BCH parity is transmitted using the L4 bit. The modulator 34 generates a modulated signal by mapping the symbols in a data frame generated by the frame generator 33 to signal points of 32 QAM.

Figure 17:
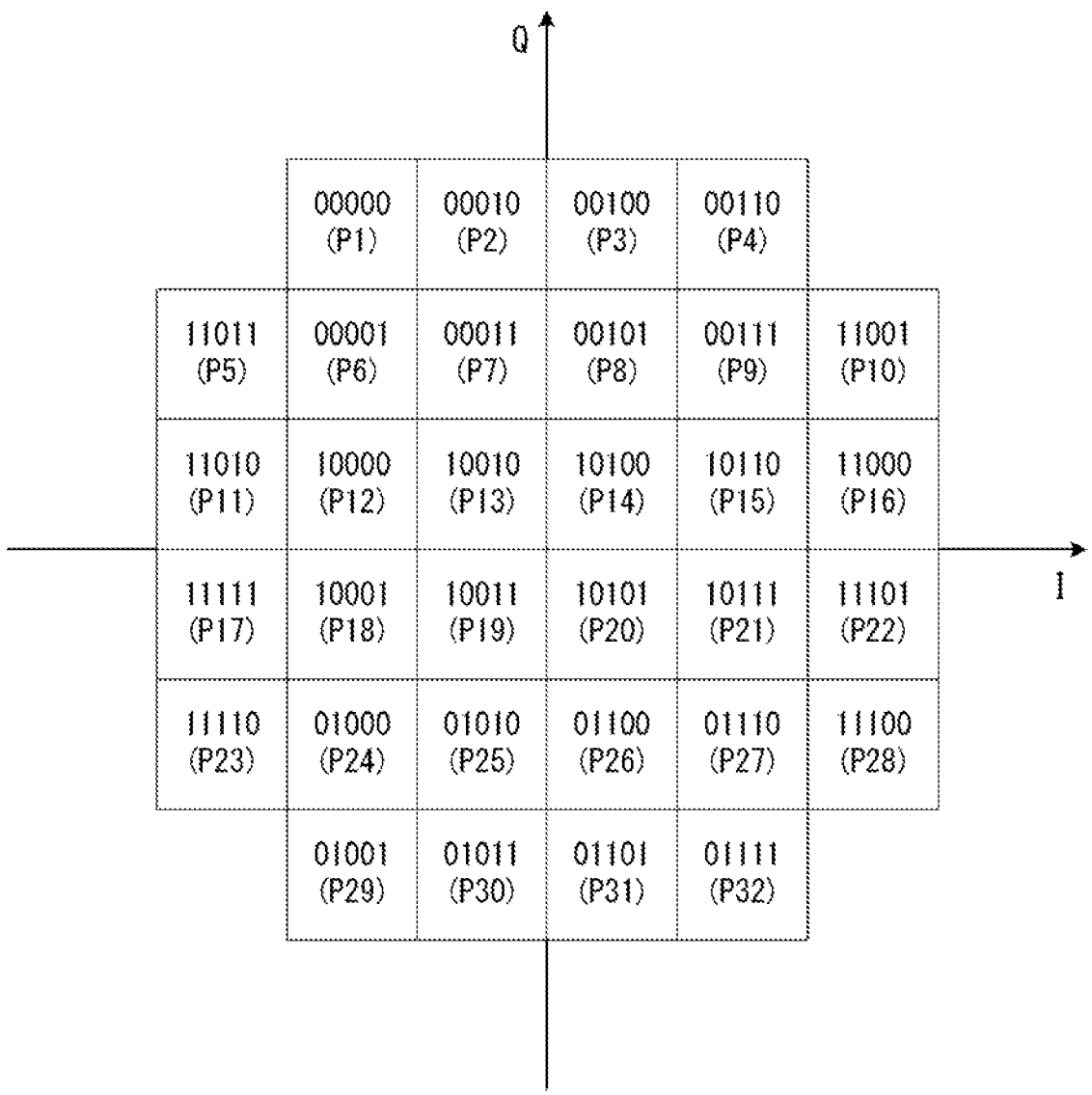
FIG. 17 illustrates a variation of a mapping rule for 32 QAM.

FIG. 17 illustrates a variation of a mapping rule for 32 QAM. FIG. 18 illustrates the mapping rule depicted in FIG. 17 separately for each bit. As indicated in FIGS. 17 and 18, the modulator 34 performs mapping such that each pair of adjacent signal points are different from each other in terms of the values of low two bits. In particular, not only each pair of signal points adjacent to each other in the I-axis direction or the Q-axis direction on the constellation are different from each other in terms of the value of low two bits, but also each pair of diagonally adjacent signal points are different from each other in terms of the values of low two bits. For the other bits (L2-L4), as depicted in FIGS. 17 and 18, mapping is performed such that the values are equal as much as possible between adjacent signal points.

The operations of the receiver 40 are almost the same in the examples depicted in FIGS. 9A-11 and the examples depicted in FIGS. 16A-18. However, the LLR calculator 42 calculates an LLR value for each bit in the L0-L1 regions. The LDPC decoder 43 decodes L0-L1 bit strings by using an LDPC parity. The multi-stage decoder 44 demaps received symbols by using a decision result provided by the LDPC decoder 43. The BCH decoder 45 performs BCH decoding for a decision result provided by the multi-stage decoder 44.

As described above, in the examples depicted in FIGS. 16A-18, mapping is performed such that each pair of adjacent signal points are different from each other in terms of the values of the low two bits of the five bits allocated to a 32 QAM symbol. In this regard, an error tends to occur when bit values are different between adjacent signal points. In particular, an error occurs more easily at low two bits than at high three bits. Accordingly, a coding scheme with a high correction capability (LDPC code in this example) is used for the low two bits. The receiver 40 recovers the low two bits by performing iterative processing using soft decision information. Thus, the data quality in the examples depicted in FIGS. 16A-18 may be higher than that in the examples depicted in FIGS. 9A-11. However, in comparison with the example depicted in FIGS. 9A-11, the example depicted in FIGS. 16A-18 involves an increase in power consumption due to an increase in the number of bits for which iterative processing using soft decision information is performed.

In the examples depicted in FIGS. 8-18, multiple coding uses BCH code and LDPC code. However, the invention is not limited to this method. In particular, the communication system 100 can use a plurality of desired coding schemes for multilevel coding. However, the communication system 100 preferably uses two coding schemes with different error correction capabilities. In this case, for example, Reed-Solomon code may be used instead of BCH code. For example, turbo code may be used instead of LDPC code. Furthermore, signals that have been encoded using a coding scheme with a high error correction capability is preferably decoded by the receiver 40 through iterative processing using soft decision information.

In the examples described above, LDPC code is used for least significant bits/low two bits. However, the invention is not limited to this configuration. In particular, an LDPC code may be used for any one or two of a plurality of bits allocated to each symbol.

In the examples described above, the coding scheme for encoding least significant bits/low two bits has a higher error correction capability than the coding scheme for encoding the entirety of data. However, the invention is not limited to this configuration. In particular, the only requirement is that the coding scheme for encoding the entirety of data be different from the coding scheme for encoding least significant bits/low two bits.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication system in which data is transmitted from a first communication device to a second communication device with 32 Quadrature Amplitude Modulation (QAM) allocating five bits to each symbol,
the first communication device includes:
a modulator configured to generate a modulated signal by mapping each symbol in a data frame that includes the data, a first code, and a second code to a signal point among two-dimensionally arranged signal points specific to 32 QAM;
a first encoder configured to encode the data by using a first coding scheme so as to generate the first code; and
a second encoder configured to encode, by using a second coding scheme different from the first coding scheme, a bit string formed from one specified bit in five bits allocated to each symbol in the data frame so as to generate the second code,
the second communication device includes a decoder unit configured to perform, for the modulated signal, a decoding process based on the first coding scheme and a decoding process based on the second coding scheme so as to recover the data,
the decoder unit of the second communication device includes
a second decoder configured to decode the bit string in the data frame by using the second coding scheme,
a multi-stage decoder configured to decide each symbol in the data frame by using a decoding result provided by the second decoder so as to recover the data, the first code, and the second code, and
a first decoder configured to decode the recovered data based on the recovered first code by using the first coding scheme,
the second decoder recovers the bit string through iterative processing using soft decision information of the one specified bit of each symbol in the data frame, and
the modulator performs mapping such that each pair of signal points adjacent to each other in any of directions of coordinate axes in two-dimensional coordinates in which 32 signal points corresponding to 32 QAM are arranged are different from each other in terms of a value of the one specified bit among the five bits.

2. The communication system according to claim 1, wherein
the first communication device further includes a frame generator configured to generate a data frame that includes the data, the first code generated by the first encoder, and the second code generated by the second encoder, and
the frame generator disposes the second code at an area for the one specified bit in the data frame.

3. The communication system according to claim 2, wherein the frame generator disposes the first code at an area for a bit in the data frame other than the one specified bit.

4. The communication according to claim 1, wherein
the one specified bit is a least significant bit of five bits allocated to each symbol, and
the modulator performs mapping such that each pair of signal points adjacent to each other in any of the directions of the coordinate axes in the two-dimensional coordinates are different from each other in terms of a value of the least significant bit among the five bits.

5. A communication system in which data is transmitted from a first communication device to a second communication device with 32 Quadrature Amplitude Modulation (QAM) allocating five bits to each symbol,
the first communication device includes:
a modulator configured to generate a modulated signal by mapping each symbol in a data frame that includes the data, a first code, and a second code to a signal point among two-dimensionally arranged signal points specific to 32 QAM;
a first encoder configured to encode the data by using a first coding scheme so as to generate the first code; and
a second encoder configured to encode, by using a second coding scheme different from the first coding scheme, a bit string formed from two specified bits in five bits allocated to each symbol in the data frame so as to generate the second code,
the modulator performs mapping such that each pair of signal points adjacent to each other in any of directions of coordinate axes in two-dimensional coordinates in which 32 signal points corresponding to 32 QAM are arranged are different from each other in terms of values of at least one of the two specified bits among the five bits and such that each pair of signal points diagonally adjacent to each other with respect to any of the coordinate axes are different from each other in terms of the values of at least one of the two specified bits among the five bits,
the second communication device includes:
a second decoder configured to decode the bit string in the data frame by using the second coding scheme,
a multi-stage decoder configured to decide each symbol in the data frame by using a decoding result provided by the second decoder so as to recover the data, the first code, and the second code, and
a first decoder configured to decode the recovered data based on the recovered first code by using the first coding scheme, and
the second decoder recovers the bit string through iterative processing using soft decision information of the two specified bits of each symbol in the data frame.

6. A communication device for receiving data transmitted from a transmitter with 32 Quadrature Amplitude Modulation (QAM) allocating five bits to each symbol,
the transmitter includes
a modulator configured to generate a modulated signal by mapping each symbol in a data frame that includes the data, a first code, and a second code to a signal point among two-dimensionally arranged signal points specific to 32 QAM;
a first encoder configured to encode the data by using a first coding scheme so as to generate the first code; and
a second encoder configured to encode, by using a second coding scheme different from the first coding scheme, a bit string formed from one specified bit in five bits allocated to each symbol in the data frame so as to generate the second code,
the modulator performs mapping such that each pair of signal points adjacent to each other in any of directions of coordinate axes in two-dimensional coordinates in which 32 signal points corresponding to 32 QAM are arranged are different from each other in terms of a value of the one specified bit among the five bits,
the communication device includes
a second decoder configured to decode the bit string in the data frame by using the second coding scheme,
a multi-stage decoder configured to decide each symbol in the data frame by using a decoding result provided by the second decoder so as to recover the data, the first code, and the second code, and
a first decoder configured to decode the recovered data based on the recovered first code by using the first coding scheme, and
the second decoder recovers the bit string through iterative processing using soft decision information of the one specified bit of each symbol in the data frame.

* * * * *